(12) United States Patent
Kikinis

(10) Patent No.: US 8,108,487 B2
(45) Date of Patent: *Jan. 31, 2012

(54) SIMULCAST WEB PAGE DELIVERY

(75) Inventor: Dan Kikinis, Saratoga, CA (US)

(73) Assignee: JLB Ventures LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/856,977

(22) Filed: Aug. 16, 2010

(65) Prior Publication Data

US 2010/0312856 A1 Dec. 9, 2010

Related U.S. Application Data

(60) Continuation of application No. 12/018,258, filed on Jan. 23, 2008, now Pat. No. 7,836,149, which is a division of application No. 09/718,595, filed on Nov. 21, 2000, now Pat. No. 7,349,975, which is a division of application No. 08/825,209, filed on Mar. 27, 1997, now Pat. No. 6,205,485.

(51) Int. Cl.
*G06F 15/16* (2006.01)

(52) U.S. Cl. ............ 709/217; 709/219; 709/203

(58) Field of Classification Search ............ 709/203, 709/217, 219
See application file for complete search history.

(56) References Cited

U.S. PATENT DOCUMENTS

| | | | |
|---|---|---|---|
| 4,621,259 A | 11/1986 | Schepers et al. | |
| 4,706,121 A | 11/1987 | Young | |
| 4,868,866 A | 9/1989 | Williams, Jr. | |
| 4,908,713 A | 3/1990 | Levine | |
| 5,270,829 A | 12/1993 | Yang | |
| 5,289,288 A | 2/1994 | Silverman et al. | |
| 5,404,393 A | 4/1995 | Remillard | |
| 5,485,197 A | 1/1996 | Hoarty | |
| 5,495,607 A | 2/1996 | Pisello et al. | |
| 5,508,815 A | 4/1996 | Levine | |
| 5,517,257 A | 5/1996 | Dunn et al. | |
| 5,526,034 A | 6/1996 | Hoarty et al. | |
| 5,548,338 A | 8/1996 | Ellis et al. | |
| 5,550,576 A | 8/1996 | Klosterman et al. | |
| 5,550,578 A | 8/1996 | Hoarty et al. | |
| 5,568,272 A | 10/1996 | Levine | |
| 5,579,057 A | 11/1996 | Banker et al. | |
| 5,585,858 A | 12/1996 | Harper et al. | |
| 5,594,509 A | 1/1997 | Florin et al. | |
| 5,617,565 A | 4/1997 | Augenbraun et al. | |
| 5,619,274 A | 4/1997 | Roop et al. | |
| 5,623,601 A | 4/1997 | Vu | |
| 5,678,012 A | 10/1997 | Kimmich et al. | |

(Continued)

*Primary Examiner* — Joseph Avellino
*Assistant Examiner* — Marshall McLeod
(74) *Attorney, Agent, or Firm* — Banner & Witcoff, Ltd.

(57) ABSTRACT

A multimedia broadcast system provides program schedule information simulcast as a Hyper Text Markup Language (HTML) data stream including commands and displayable, selectable indicia associated with the commands, along with programs for display. A set top box is adapted to separate the HTML data stream and to store that data in a cache as WEB pages retrievable by a WEB browser in the set top box, whereupon the program schedule information is displayed including the displayable, selectable indicia. Selecting the indicia directs the set top box via the associated command to tune to a program associated with the displayable indicia. The indicia may be any text, icon, dynamic figurine, and the like. In a preferred embodiment program schedule WEB pages, including the commands and displayable indicia, are stored especially marked on a WEB server coupled to the Internet and to a scanner adapted to scan the WEB server for marked pages, and to upload the marked pages to a satellite broadcast system.

14 Claims, 4 Drawing Sheets

U.S. PATENT DOCUMENTS

| | | |
|---|---|---|
| 5,682,196 A | 10/1997 | Freeman |
| 5,684,525 A | 11/1997 | Klosterman |
| 5,694,546 A | 12/1997 | Reisman |
| 5,724,492 A | 3/1998 | Matthews, III et al. |
| 5,727,060 A | 3/1998 | Young |
| 5,727,159 A | 3/1998 | Kikinis |
| 5,737,619 A | 4/1998 | Judson |
| 5,751,282 A | 5/1998 | Girard et al. |
| 5,758,259 A | 5/1998 | Lawler |
| 5,760,821 A | 6/1998 | Ellis et al. |
| 5,774,664 A | 6/1998 | Hidary et al. |
| 5,781,246 A | 7/1998 | Alten et al. |
| 5,784,464 A | 7/1998 | Akiyama et al. |
| 5,801,753 A | 9/1998 | Eyer et al. |
| 5,805,763 A | 9/1998 | Lawler et al. |
| 5,808,608 A | 9/1998 | Young et al. |
| 5,808,613 A | 9/1998 | Marrin et al. |
| 5,809,204 A | 9/1998 | Young et al. |
| 5,815,145 A | 9/1998 | Matthews, III |
| 5,818,935 A | 10/1998 | Maa |
| 5,822,123 A | 10/1998 | Davis et al. |
| 5,825,884 A | 10/1998 | Zdepski et al. |
| 5,826,166 A | 10/1998 | Brooks et al. |
| 5,828,945 A | 10/1998 | Klosterman |
| 5,844,620 A | 12/1998 | Coleman et al. |
| 5,850,218 A | 12/1998 | LaJoie et al. |
| 5,850,352 A | 12/1998 | Moezzi et al. |
| 5,857,181 A | 1/1999 | Augenbraun et al. |
| 5,861,881 A | 1/1999 | Freeman et al. |
| 5,867,219 A | 2/1999 | Kohiyama |
| 5,883,677 A | 3/1999 | Hofmann |
| 5,889,950 A | 3/1999 | Kuzma |
| 5,907,322 A | 5/1999 | Kelly et al. |
| 5,912,612 A | 6/1999 | DeVolpi |
| 5,923,362 A | 7/1999 | Klosterman |
| 5,929,850 A | 7/1999 | Broadwin et al. |
| 5,940,073 A | 8/1999 | Klosterman et al. |
| 5,949,954 A | 9/1999 | Young et al. |
| 5,970,206 A | 10/1999 | Yuen et al. |
| 5,982,445 A | 11/1999 | Eyer et al. |
| 5,987,043 A | 11/1999 | Brown et al. |
| 6,020,881 A | 2/2000 | Naughton et al. |
| 6,034,678 A | 3/2000 | Hoarty et al. |
| 6,037,933 A | 3/2000 | Blonstein et al. |
| 6,072,983 A | 6/2000 | Klosterman |
| 6,076,109 A | 6/2000 | Kikinis |
| 6,078,348 A | 6/2000 | Klosterman et al. |
| 6,100,883 A | 8/2000 | Hoarty |
| 6,111,614 A | 8/2000 | Mugura et al. |
| 6,154,203 A | 11/2000 | Yuen et al. |
| 6,205,485 B1 | 3/2001 | Kikinis |
| 6,205,582 B1 | 3/2001 | Hoarty |
| 7,349,975 B2 | 3/2008 | Kikinis |
| 2003/0110161 A1 | 6/2003 | Schneider |

`<a href="tune:B3:CH7"><font size=2>[ HBO™ ]</font>`

*Fig. 4*

SIMULCAST WEB PAGE DELIVERY

CROSS-REFERENCE TO RELATED APPLICATIONS

The present invention is a continuation of application Ser. No. 12/018,258, entitled "SIMULCAST WEB PAGE DELIVERY" and filed Jan. 23, 2008, which is a divisional of application Ser. No. 09/718,595, entitled "SIMULCAST WEB PAGE DELIVERY" and filed on Nov. 21, 2000, which is a divisional of application Ser. No. 08/825,209 which is related to copending patent application Ser. No. 08/791,249, and to copending patent application Ser. No. 08/629,475 of which the former is a Continuation-in-Part, and the disclosures of these prior applications are incorporated herein in their entirety by reference.

FIELD OF THE INVENTION

The present invention is in the area of multimedia communications, and pertains more particularly to systems for delivering multimedia content by both satellite and land-based network connections.

BACKGROUND OF THE INVENTION

At the time of filing the present patent application many new systems have been publicly introduced for delivery of multimedia content, which is broadly defined in the disclosure as any stored data and information which may be transmitted to end users for their use. Examples are music, video clippings, TV programs of all sorts, and WEB pages from WEB servers interconnected through the world-wide public network well-known as the Internet.

The term multimedia came into use as a result of a concept and effort to combine and integrate systems to deliver such information for a broad range of uses, many of which have a commercial aspect. Many such systems have been introduced at the time of this filing, and many more are in the offing. A good example is what is broadly known as a set-top box, which is an electronic unit adapted to be connected to a television set, and to receive and cause to be played (both audio and video presented), typically through the television apparatus. In many instances set-top boxes have a CPU and are connectable to personal computers, and may also interface to computer peripheral equipment such as keyboards and printers, and may respond as well to input devices like infrared remote controllers.

In any case, set-top boxes, cable TV delivery (both analog and digital), satellite TV (both analog and digital), analogue and digital audio, and information accessed as WEB pages from Internet-connected servers via satellite, land, and wireless connections are all well-known in the art, and the general standards by which all of this apparatus works is similarly well-known. A detailed description of underlying hardware, software, and the like for such systems is not attempted in this disclosure, as such information is readily available to both the present inventor and to any worker with skill.

Although much has been done to bring WEB-based information and television programming together, much innovative work remains to be done. The inventor takes notice for example, that even with the advent of computerized set top boxes, a user must operate in one realm or another. For example, the user can switch between TV channels to watch TV, or he/she may operate the set top box as a WEB browser, with the television CRT acting as the display monitor. Alternatively (In some systems known to the inventor) the user may operate the TV and set top box as a personal computer, running various computer applications.

Only relatively recently have set top box systems been adapted for receiving WEB-based information (meaning information stored as web pages on servers interconnected on the Internet) delivered by satellite, but now this phenomenon is relatively common. Intel™ Corporation has recently announced a joint venture with satellite companies to deliver multimedia content by satellite. Still such systems are not truly integrated, and a user must switch between one mode of operation and another.

What is clearly needed is a system for delivery of multimedia content wherein the boundaries between TV programming and such as WEB browsing are removed, and a user may seamlessly operate in any realm with a single user interface and interactive tools, perceiving to be only in one virtual realm.

SUMMARY OF THE INVENTION

In a preferred embodiment of the present invention a set top box is provided, comprising a broadband receiver for receiving multimedia information including a data stream constituting a command and a displayable indicia associated with the command; tuner/demultiplexer circuitry for separating a displayable data stream from the multimedia information, and for sending the displayable data stream including the displayable indicia to a display monitor, forming a display with the displayable indicia thereon; and user-operable apparatus adapted for selecting the displayable indicia. In response to the user selecting the displayable indicia, the display is altered. In some embodiments alteration of the display comprises switching the display to a channel associated with the selected indicia.

In preferred embodiments a portion of the multimedia information received comprises WEB pages in Hyper Text Markup Language (HTML). Also in preferred embodiments the broadband receiver comprises a satellite data link adapted to download a satellite-broadcast data stream, and the multimedia information includes a data stream constituting a command and a displayable indicia associated with the command. A portion of the multimedia information received by satellite data link comprises Hyper Text Markup Language (HTML).

A first portion of the multimedia information in certain embodiments of the invention comprises television programming, and a second portion comprises program schedule information associated with the television programming, the program schedule information including the command and displayable indicia associated with the command. There is in some preferred embodiments a cache memory system wherein the program schedule information including the command and displayable indicia associated with the command are stored, and a driver adapted to coordinate the cache and the second portion of the multimedia information. There may also be a land-based modem, and the multimedia information including a data stream constituting a command and a displayable indicia associated with the command may be received by either one of the satellite data link and the land-based modem. The set top box in many embodiments further comprises a user-operable WEB browser for browsing for HTML-based WEB pages.

In another aspect of the invention a WEB server is provided, comprising a scanner for periodically scanning HTML-based WEB pages stored on the server; and a satellite uplink system coupled to the scanner. In these embodiments the scanner is adapted for selecting especially-marked WEB pages, and uploading those pages via the satellite uplink system. The WEB server may further comprise a land-based Internet connection.

In yet another aspect a system is provided for controlling presentation of multimedia broadcasts, comprising a WEB server upon which program schedule information is stored in one or more especially-marked WEB pages, wherein the content of the WEB pages includes commands and displayable indicia associated with the commands; a satellite uplink system coupled to the WEB server; a scanner adapted for periodically scanning content of the WEB server and uploading the especially-marked pages to the satellite uplink system; and a receiver adapted for receiving both the multimedia broadcasts and the especially-marked WEB pages including commands and displayable indicia associated with the commands, and further adapted for displaying the program schedule information on a display monitor in a manner that the displayable indicia become user-selectable interfaces for initiating the commands at the receiver. Methods for practicing the invention are also disclosed.

BRIEF DESCRIPTION OF THE DRAWINGS

FIG. 4 is an example of a novel Tag in a simulcast broadcast, wherein the tag operates as a hyperlink.

DESCRIPTION OF PREFERRED EMBODIMENTS

Figure 1:
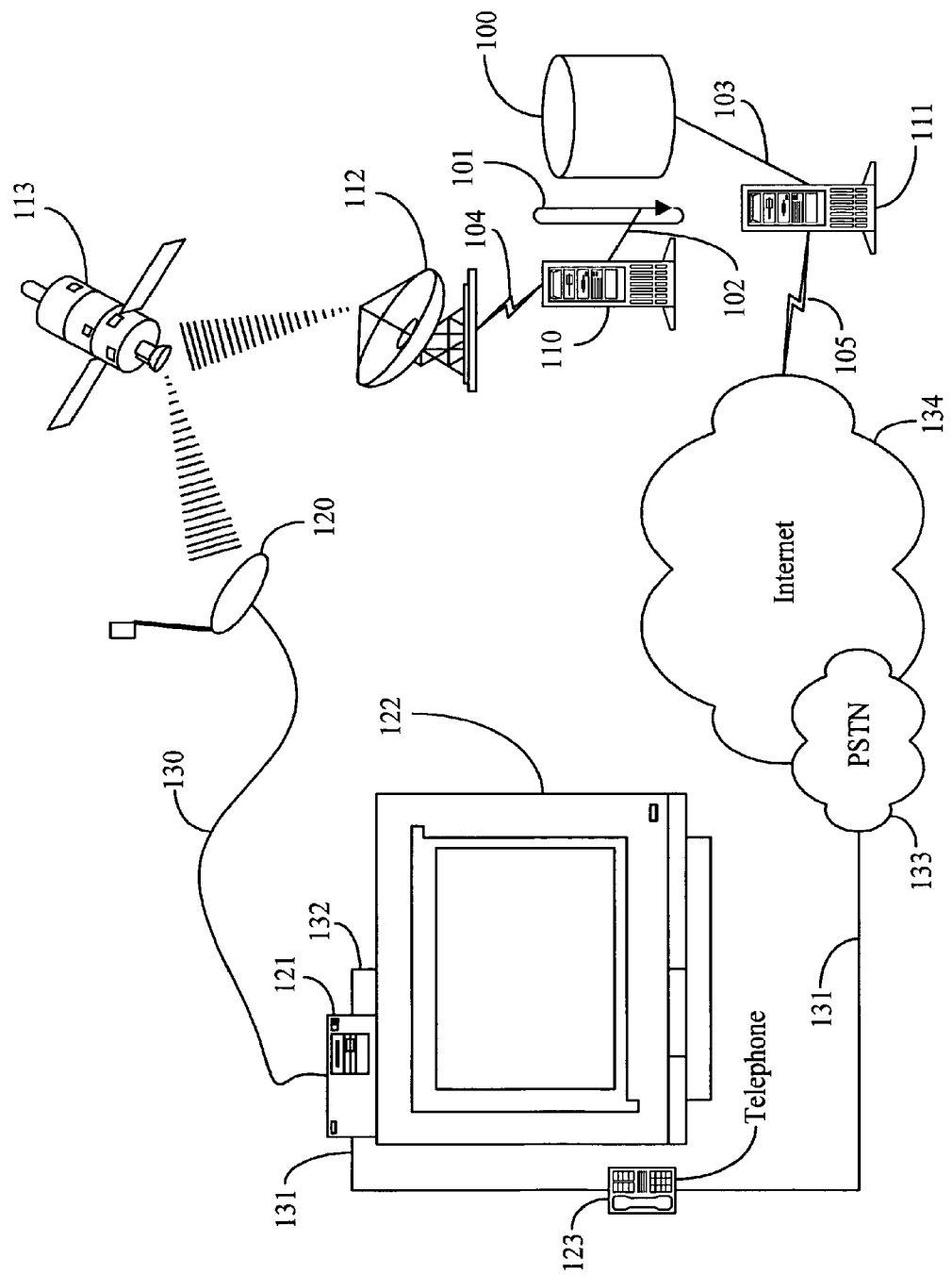
FIG. 1 is an overview of a Simulcast system according to a preferred embodiment of the present invention.

FIG. 1 is an overview of a Simulcast system according to a preferred embodiment of the present invention. Database 100 is a database of WEB pages and like information, as is conventionally supported on a Web server on the well-known World Wide WEB system interconnected on the Internet. Database 100, for example is accessed via link 103 by a conventional Web server 111 coupled by exemplary link 105 to the Internet, represented as an Internet cloud 134.

A public switched telephone network (PSTN) 133 is shown coupled to network cloud 134, as is known in the art, and a telephone line 131 leads to a port on a set top box 121 connected by a display data line 132 to a television 122. A telephone 123 is shown in the path of telephone line 131, indicating an alternative use.

The description of the above two paragraphs is a description of existing technology wherein WEB browsing may be done via a set top box and a connected television set, assuming interface controls for a user to interact with the system to enter Universal Resource Locators (URLs), activate hyperlinks, and the like.

Attention is now directed back to database 100 in FIG. 1. This database in an embodiment of the present invention stores some WEB pages which, for any reason held by the WEB pager provider, may be restricted to certain identifiable persons, which will referred to in general herein as subscribers. This sort of restriction is well-known in the art as well, such as for membership-only pages, wherein subscribers pay a periodic fee to be able to access and download programs, videos, images, audio selections, and the like.

In an innovative aspect of the present invention the WEB content of database 100 is scanned in a repetitive operation indicated by loop arrow 101. This scanning operation may in some embodiments be continuous, or in others be periodic and repetitive, depending on specific system requirements. The operation of scanning is not described herein in great detail, because the functionality is known technology such as is used in database search functions. It is rather the point and purpose, and the result of the scanning used in other aspects of the invention which is inventive. Further, it is to be understood that the scanning operation of the database could be accomplished by an application running on a separate server 110, as shown in FIG. 1, or may alternatively be an application running on virtually any WEB server, server 111 for example, or on another sort of computerized machine.

The point of scanning in this embodiment of the invention is to access and upload especially marked WEB pages, which may be marked for the purpose just as other WEB pages are marked for restricted use, or in any manner that the marking may be identified by a scanning operation as described herein with reference to loop arrow 101. The mark may be part of the page, or part of the database. WEB pages thus acquired are uploaded in a data stream via link 104 and satellite dish 112 to a satellite 113, where the data stream is broadcast by the satellite to reception dishes, represented here by dish 120. The data stream containing the especially-marked WEB material acquired by uplink server 110 is received by dish 120 connected by link 130 to set top box 121, where the material is used in a manner described in more detail below.

In a preferred embodiment of the present invention the especially marked pages are provided in database 100 by various programming service providers, such as the major networks (ABC™, CBS™, NBC™), cable channel providers, satellite TV services such as Primestar™ and others, and generally by any organization having an interest in providing to the public advanced notice of program availability and scheduling. It is also important to emphasize that the especially marked WEB pages provided to database 100 by interested service providers are not limited in access to simulcast scanner represented by server 110 and scanning loop 101. These pages may also be accessed by authorized parties over the Internet in the normal manner.

In an important aspect of the present invention, expanded upon in more detail below, the WEB information acquired by scanning database 100 is transmitted via satellite in hypertext markup language (HTML) format, including one or more unique tags that convey commands to the set top box to accomplish a number of unique functions.

One such command-bearing tag is acted upon by set top box 121 in a manner such that links may be displayed in the acquired pages displayed on TV 121 (or on any other display monitor), and such a link, when selected, can cause the system to change channels. These links can be any kind of indicia in a display, such as text, one or more icons, a shape, or even a portion of background in the video display. That is, in a specific embodiment, a CPU in the set top box controls a tuner in the set top box to tune to and cause to be displayed a specific channel indicated in the link initiated by the special tag in the HTML transmission of the special pages acquired by the Simulcast scanner. The link may be displayed in a program schedule matrix by text in a specific color, similar to the way hyperlinks are displayed in a WEB page displayed on a display monitor of a PC. A user of such a set top box will have an input apparatus, which may be an infra-red remote controller, which allows the user to point and select in much the same manner that a PC user uses a pointer device. When a user selects such a link in a program schedule, however, the action initiates the CPU addressing the tuner to switch to the channel on which the selected program is broadcast.

Many other such tags can be embedded in the HTML data stream received by such a set top box. A similar set of tagged commands may, for example, provide for combined displays such as pix-on-pix, wherein, commanded by a tag in a satellite transmitted WEB page, a running sample of a program to be broadcast may be placed in a small frame (window) in the program matrix displayed, and selecting the preview frame may command the CPU to cause the tuner to display that program in full screen.

It will be apparent to those with skill in the art that, given the nature of the present teaching, tags may be embedded in such a broadcast data stream in a manner to command many sorts of actions at a set top box adapted to operate with such commands, as is taught in more detail below.

The value to programming service providers now becomes clear. In a typical situation a programming service provider, for example Home Box Office (HBO™), has a vested interest in informing the public about upcoming programming. Clearly that interest is the economic interest of attracting audience which maximizes revenue. Also typically, such a service provider has a considerable investment in creating copy of future programming in a number of forms. Copy for print media (TV-Guide, newspapers, magazines, and the like) must be provided. Copy for broadcast must be provided as well. Other copy is needed for on-line services and the like. In an embodiment of this invention, the information needs to be prepared in just one format, that being the especially marked WEB pages, and all interested parties may access the information by either standard network access, or alternatively by use of apparatus according to the present invention to view acquired pages transmitted by satellite in the manner illustrated by FIG. 1 and described herein.

Other advantages for various service providers are now readily apparent as well, provided by the much enhanced functionality of set top boxes according to embodiments of the present invention. For example subscribers could preview movies from the office by downloading a clip over the Internet, when browsing the program pages, even when in the office.

Figure 2:
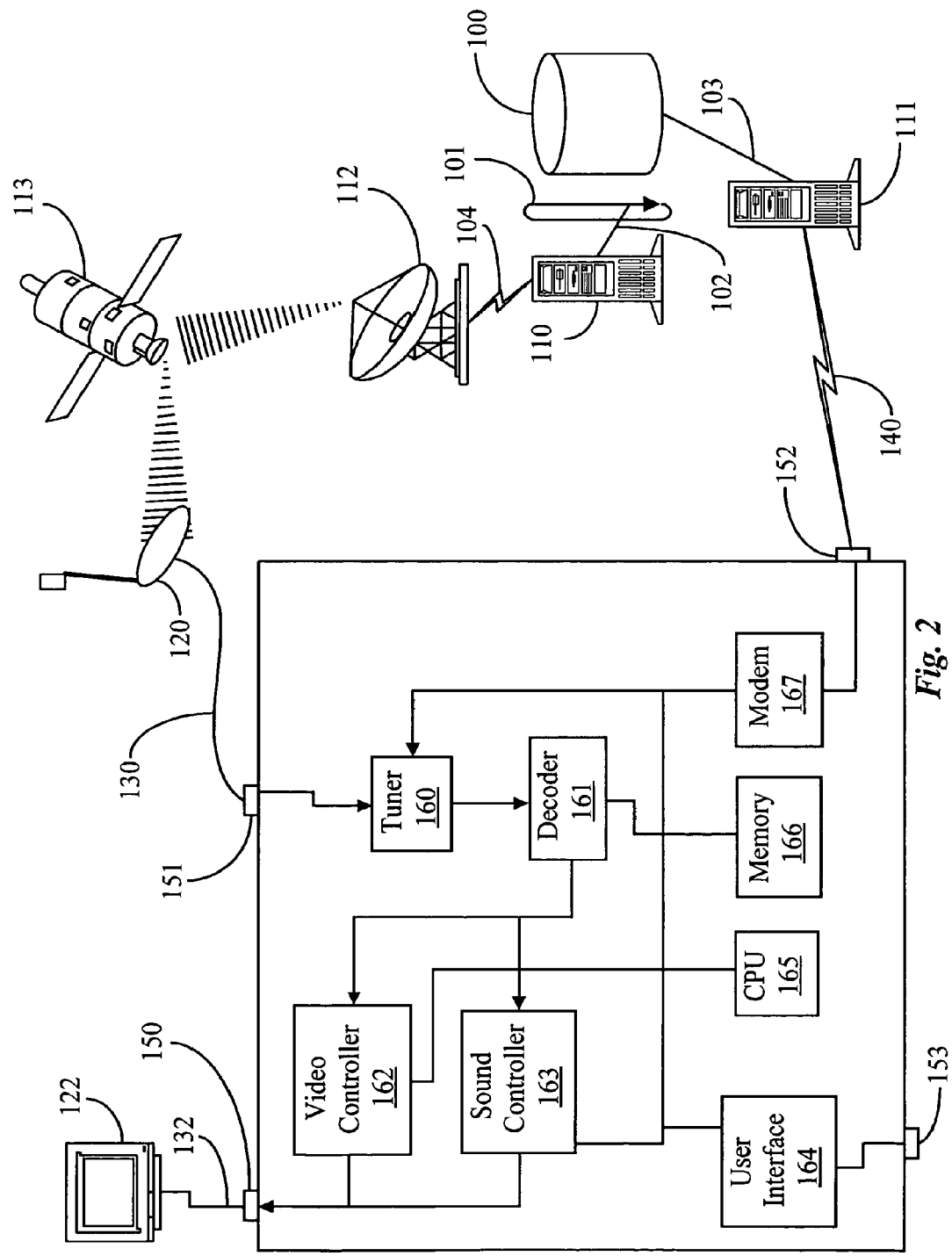
FIG. 2 is a system diagram showing detail of elements of a set top box according to an embodiment of the present invention.

FIG. 2 is a system diagram showing detail of elements of a set top box according to an embodiment of the present invention, along with other elements already described with reference to FIG. 1. The land connection to set top box 121, represented in FIG. 1 by link 105, the Internet cloud, PSTN 133, and telephone line 131 is now represented by link 140. The land-based link connects to set top box 121 at port 152 coupled to modem 167. Port 150 is for display link 132 to TV 122 or to a home entertainment system including a display and audio rendering equipment. Port 151 receives signals from satellite sources via link 130 to dish 120 as also shown in FIG. 1. Port 153 is a user interface for such as infra-red remote control, keyboard, printer, PC and so on. It will be apparent to those with skill in the art that there could be other ports and connections as well.

All elements of set top box 121 are shown in their most generic form, and all special features are implemented in the software and organization as shown and described below with reference to FIG. 3. It will be clear to one with skill in the art that the partitioning between software and hardware can be done in many different ways, and different organization of functionality might be used to achieve the functions described herein Hence the present description is exemplary of many embodiments within the spirit and scope of the present invention.

In set top box 121 as shown in FIG. 2, port 151 leads to a tuner 160 and decoder 161 as known in the art. A sound controller 163 and video controller 162 provide output to port 150. User interface circuitry 164 couples to port 153 as needed to provide the user interfaces, such as infra-red remote control as described above. A CPU 165 is provided for logic and overall control, and a memory 166, which may take one or more of several known forms is provided for storage of operating code and temporary storage of data and the like. All of the internal components are interconnected on a parallel bus 168 in this embodiment, with suitable bus controller and so forth as known in the art. Power is provided to all components by an internal power supply and converter in ways well-known in the art, and hence not shown in detail here.

Figure 3:
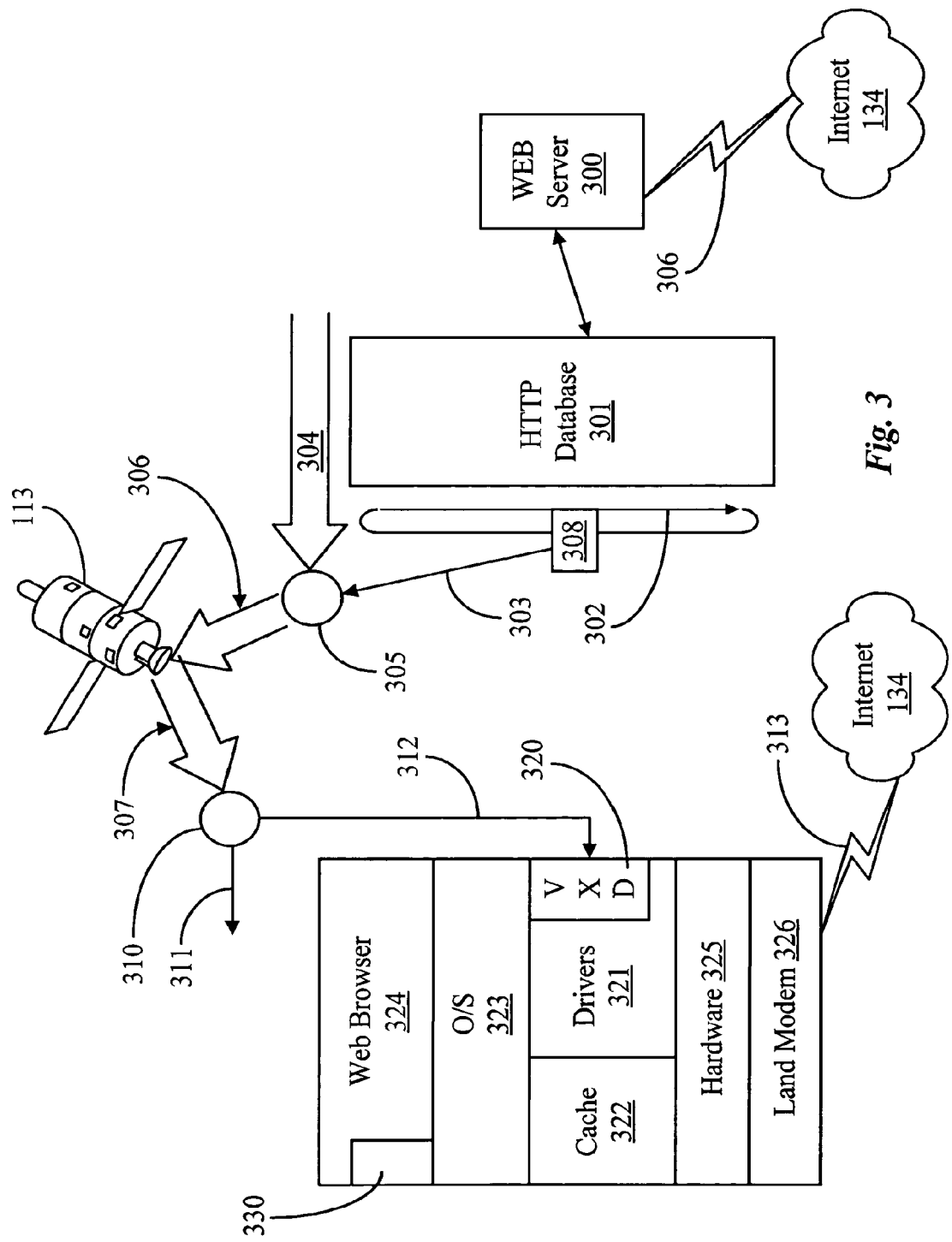
FIG. 3 shows innovative aspects of software in an embodiment of the invention.

FIG. 3 is an alternative view of the system of FIG. 1 and FIG. 2 in a preferred embodiment of the present invention, extracted and simplified to describe software organization and dataflow. Database 100 is coupled to server 111, which is in turn coupled to the Internet by link 105. This path handles requests from the Internet for content from database 100. Depending on the wishes of the content providers, some of the data is made available only to identifiable customers and so forth as was described above.

As also described above, access to especially marked programming content pages, that typically would exhibit program schedules by date and time in perhaps a matrix fashion may also be integrated with streaming video, providing, for example, previews of coming attractions. Also, fancy displays can be used, such as a virtual 3D "ProgramScape," that lets you view programming as representations of figurines in a 3D virtual environment, showing the principals of those shows and movies as those figurines. By clicking on one of those figurines, details about the programming may be obtained. Such a space could be extracted as a filtered database, organized by days, shows, interests (user profiles), etc. These features provide an ability, for example, for an authorized person to download the programming information via a normal Internet connection, and in the afternoon to preview from his/her office before going home the evening programming on pay TV, and to plan viewing activities according to the previews provided.

In FIG. 3 server 110, running a Simulcast application according to an embodiment of the present invention scans database 100 by scanning operation 101 and uploads especially marked WEB content bearing, in many instances, tags constituting commands for controlling functionality of a set top box in data stream 303 to a system modulator 305, where data stream 303 is multiplexed with the general broadcast stream 304. Modulator 305 is typically a transport stream multiplexer (mux) as used in VSS or BVD satellite standards, but other embodiments are possible. From mux 305 the combined data stream is uplinked to satellite 113, and then rebroadcast as stream 307 to any adapted systems capable of receiving and using the data stream.

Stream 307 is received in dish 120 and is demultiplexed in demultiplexer (demux) 310, which is basically part of the tuner box as seen in FIG. 2 (elements 160 and 161). The video stream of the signal to which the circuitry is tuned is separated out as known in the art and shown as stream 311 going to a display. In the system as shown in FIG. 2 this data stream is from decoder 161 to sound and video controllers 162 and 163, and on to TV 122, for example, via port 150 and link 132. Demux 310 is adapted as well to provide a separate data stream 312 comprising the especially marked and tagged WEB pages scanned from database 100 by Simulcast scanner server 110. This data stream is delivered via a special driver 320 and put into a cache 322, which may be considered a part of memory system 166 in FIG. 2. Not shown here, but in normal use are so-called Controlled Access devices (CA). It is clear that separate levels can be used for each stage of each data stream, and so it could be also applied to stream 312.

The operating code provided to set top box 121 in an embodiment of the present invention includes a WEB browser 324. If WEB browser 324 is now employed by a user to browse for the programming pages provided by the tagged Web content broadcast as described above, many or all of such pages may be stored in cache 322. Those pages found in the cache do not have to be searched from the Internet by modem 167, but can be taken directly out of the cache. That means that during normal operation, since the cache is being continuously replenished by stream 312, no programming would ever require a normal Internet connection.

In an embodiment of the present invention a plug-in 330 in browser 324 is provided as the software link to operate with the special tags embedded in the WEB pages scanned and provided on a continuous or other repetitive basis to cache 322. It is plug-in 330 that provides commands to CPU 165 to change channels and so forth according to the functionality of the commands. This is a simplistic showing of the actual process, since in a digital satellite system the tuner is only a part of the channel selection, and there are other functional layers such as the transport stream demuliplexer, the encryption controlled access, and so on, which all have to work together in order to generate a clear video stream. These elements are not shown here in particular, since they are not relevant to the inventive aspects, and the elements and their functions are all well-known to those with skill in the art.

Different types of special tags can be used to command special actions which are actualized by plug-in 330 or in some cases by specialized drivers. Set top box 121 of FIG. 2 could be in one embodiment a PC equipped with a satellite tuner card that contains all the required transport demultiplexers, and so forth, as described above, as well as the controlled access mechanisms required to get the data. The user views by selecting links initiated by the special tags in the data stream, and selection causes the CPU to tune the hardware to select channels and do other things, like changing language, etc. This makes life quite simple for the user, because it completely integrates the PC domain, the TV domain, and the WEB domain, as described above.

FIG. 4 is an example of a novel tag in a simulcast broadcast according to an embodiment of the present invention, wherein the tag operates as a hyperlink. In this simple example the text "HBO" will be displayed as a link, and when selected by a user, the system will tune to Band 3, Channel 7, which is meant to be the band and channel number in this example for HBO™. Given this teaching it will be apparent to those with skill in the art that there may be many other tags included in such broadcasts which will provide for enhanced functionality in the same manner as the example shown, in concert with operating code, such as plug-in 330 described above, for receiving and acting on such commands. The tags embedded in HTML in various embodiments can cause to be displayed indicia of any desired sort, which will serve as user-initiated links to predicate specific actions associated with the tags. Tags need not be simple text or icons. Special tags can be programmed allowing, for example, three-dimensional dynamic figures to be displayed as links, allowing, for example, for a program schedule to be displayed as a programscape including these selectable figures, as described above.

It will be apparent to those with skill in the art that there are many alterations that may be made in the embodiments of the invention described above without departing from the spirit and scope of the invention. For example, there are many ways circuits and electronic elements may be combined to perform the functions described herein, and the differences in connectivity would not be inventive over the teaching herein. There are similarly many ways that independent programmers might provide software to provide the functionality associated with the present invention as taught herein without departing from the spirit and scope of the invention. Such differences will fall within the scope of the invention. The scope of the invention is limited only by the claims which follow.

I claim:
1. A method comprising:
receiving, by a computing device, programming information for future content from one or more content sources, wherein the programming information includes a page mark and wherein the page mark is used to identify pages for transmission to a destination device; and
scanning, at the computing device, the programming information to identify one or more marked pages, wherein the one or more marked pages includes a command for controlling one or more functions of the destination device.
2. The method of claim 1, further comprising transmitting the one or more marked pages to the destination device, wherein the one or more marked pages are transmitted as a displayable data stream in a multimedia information transmission, the multimedia information transmission including one or more additional pieces of data.
3. The method of claim 1, wherein the command corresponds to a command-bearing tag included in the one or more marked pages.
4. The method of claim 1, wherein the one or more marked pages includes a webpage.
5. The method of claim 1, wherein the programming information includes television programming information.
6. One or more non-transitory computer readable media storing computer readable instructions that, when executed, cause an apparatus to:
receive programming information for future content from one or more content sources, wherein the programming information includes a page mark and wherein the page mark is used to identify pages for transmission to a destination device; and
scan the program information to identify one or more marked pages, wherein the one or more marked pages includes a command for controlling one or more functions of the destination device.
7. The one or more non-transitory computer readable media of claim 6, wherein the computer readable instructions, when executed, further cause the apparatus to transmit the one or more marked pages to the destination device, wherein the one or more marked pages are transmitted as a displayable data stream in a multimedia information transmission, the multimedia information transmission including one or more additional pieces of data.
8. The one or more non-transitory computer readable media of claim 6, wherein the command corresponds to a command-bearing tag included in the one or more marked pages.
9. The one or more non-transitory computer readable media of claim 6, wherein the one or more marked pages includes a webpage.
10. The one or more non-transitory computer readable media of claim 6, wherein the programming information includes television programming information.

11. An apparatus comprising:

at least one processor; and at least one memory operatively coupled to the at least one processor and storing computer readable instructions that, when executed, cause the apparatus to:

receive programming information for future content from one or more content sources, wherein the programming information includes a page mark and wherein the page mark is used to identify pages for transmission to a destination device; and scan the program information to identify one or more marked pages, wherein the one or more marked pages includes a command for controlling one or more functions of the destination device.

12. The apparatus of claim 11, wherein the apparatus comprises a database.

13. The apparatus of claim 11, wherein the one or more marked pages includes a webpage.

14. The apparatus of claim 11, wherein the programming information includes television programming information.

* * * * *